United States Patent
Salla et al.

(10) Patent No.: US 10,563,115 B2
(45) Date of Patent: Feb. 18, 2020

(54) ACTIVATORS FOR INORGANIC OXIDE BREAKERS

(71) Applicant: Halliburton Energy Services, Inc., Houston, TX (US)

(72) Inventors: Rajender Salla, Pune Maharashtra (IN); Jag Pravesh, Pune Maharashtra (IN)

(73) Assignee: Halliburton Energy Services, Inc., Houston, TX (US)

( * ) Notice: Subject to any disclaimer, the term of this patent is extended or adjusted under 35 U.S.C. 154(b) by 169 days.

(21) Appl. No.: 15/551,238

(22) PCT Filed: May 5, 2015

(86) PCT No.: PCT/US2015/029251
§ 371 (c)(1),
(2) Date: Aug. 15, 2017

(87) PCT Pub. No.: WO2016/178669
PCT Pub. Date: Nov. 10, 2016

(65) Prior Publication Data
US 2018/0022984 A1 Jan. 25, 2018

(51) Int. Cl.
*C09K 8/57* (2006.01)
*C09K 8/504* (2006.01)
(Continued)

(52) U.S. Cl.
CPC ............ *C09K 8/57* (2013.01); *C09K 8/03* (2013.01); *C09K 8/504* (2013.01); *C09K 8/516* (2013.01); *C09K 8/518* (2013.01); *C09K 8/52* (2013.01); *C09K 8/528* (2013.01); *C09K 8/536* (2013.01); *E21B 21/003* (2013.01); *E21B 37/00* (2013.01); *E21B 43/04* (2013.01); *E21B 43/267* (2013.01); *C09K 2208/26* (2013.01)

(58) Field of Classification Search
CPC ....................................................... C09K 8/62
See application file for complete search history.

(56) References Cited

U.S. PATENT DOCUMENTS 4,199,484 A * 4/1980 Murphey ............... C08L 1/284
427/221
4,343,363 A * 8/1982 Norton .................. E21B 43/261
166/281
(Continued)

FOREIGN PATENT DOCUMENTS

CN 101718032 A 6/2010
CN 104388061 A 3/2015
(Continued)

*Primary Examiner* — William D Hutton, Jr.
*Assistant Examiner* — Avi T Skaist
(74) *Attorney, Agent, or Firm* — McAfee & Taft

(57) ABSTRACT

Of the methods provided herein, is a method comprising: providing a treatment fluid comprising an aqueous base fluid, an inorganic oxidizer and an activator selected from the group consisting of N-acyl caprolactam based activators, substitutes benzoyl caprolactam based activators and mixtures thereof are provided; and preparing the treatment fluid for use in a down-hole operation, where the down-hole operation is either a gel breaking operation or a formation conditioning operation.

17 Claims, 3 Drawing Sheets

(51) Int. Cl.

| | |
|---|---|
| *C09K 8/536* | (2006.01) |
| *C09K 8/516* | (2006.01) |
| *C09K 8/518* | (2006.01) |
| *C09K 8/528* | (2006.01) |
| *C09K 8/03* | (2006.01) |
| *C09K 8/52* | (2006.01) |
| *E21B 21/00* | (2006.01) |
| *E21B 37/00* | (2006.01) |
| *E21B 43/04* | (2006.01) |
| *E21B 43/267* | (2006.01) |

(56) References Cited

U.S. PATENT DOCUMENTS

| | | | |
|---|---|---|---|
| 4,919,904 | A | 4/1990 | Shulik et al. |
| 5,106,518 | A * | 4/1992 | Cooney .................. C09K 8/62 |
| | | | 166/300 |
| 5,686,401 | A | 11/1997 | Willey et al. |
| 5,998,350 | A | 12/1999 | Burns et al. |
| 6,197,737 | B1 | 3/2001 | Willey et al. |
| 6,878,680 | B2 | 4/2005 | Kitko et al. |
| 8,267,176 | B2 | 9/2012 | Nguyen et al. |
| 2006/0283592 | A1 | 12/2006 | Sierra et al. |

FOREIGN PATENT DOCUMENTS

| | | |
|---|---|---|
| WO | 03102107 A1 | 11/2003 |
| WO | 2011131948 A1 | 10/2011 |

* cited by examiner

ACTIVATORS FOR INORGANIC OXIDE BREAKERS

FIELD

The present disclosure relates to enhancing the production of hydrocarbons from a subterranean formation. More particularly, the invention relates to compositions used to enhance the placement and performance of consolidating agents and to reduce the viscosity of well treatment fluids in subterranean formations.

BACKGROUND

To produce oil or gas from a reservoir, a well is drilled into a subterranean formation, which may be the reservoir or adjacent to the reservoir. A well includes a wellhead and at least one wellbore from the wellhead penetrating the earth. Typically, a wellbore must be drilled thousands of feet into the earth to reach a hydrocarbon-bearing formation. Generally, as the depth of the formation increases, the static pressure and temperature of the formation increases.

Well services include a wide variety of operations that may be performed in wells, such as drilling, cementing, completion, and intervention. Drilling, completion, and intervention operations can include various types of treatments commonly performed in a wellbore or subterranean formation. For example, a treatment for fluid-loss control can be used during any of the drilling, completion, and intervention operations. Other types of completion or intervention treatments can include, for example, gravel packing, consolidation, and controlling excessive water production. Still other types of completion or intervention treatments include, but are not limited to, damage removal, formation isolation, formation conditioning, wellbore cleanout, scale removal, and scale control. A well service usually involves introducing a well fluid, also called treatment fluid, into a well.

BRIEF DESCRIPTION OF THE DRAWINGS

Implementations of the present technology will now be described, by way of example only, with reference to the attached figures, wherein.

DETAILED DESCRIPTION

Figure 1:
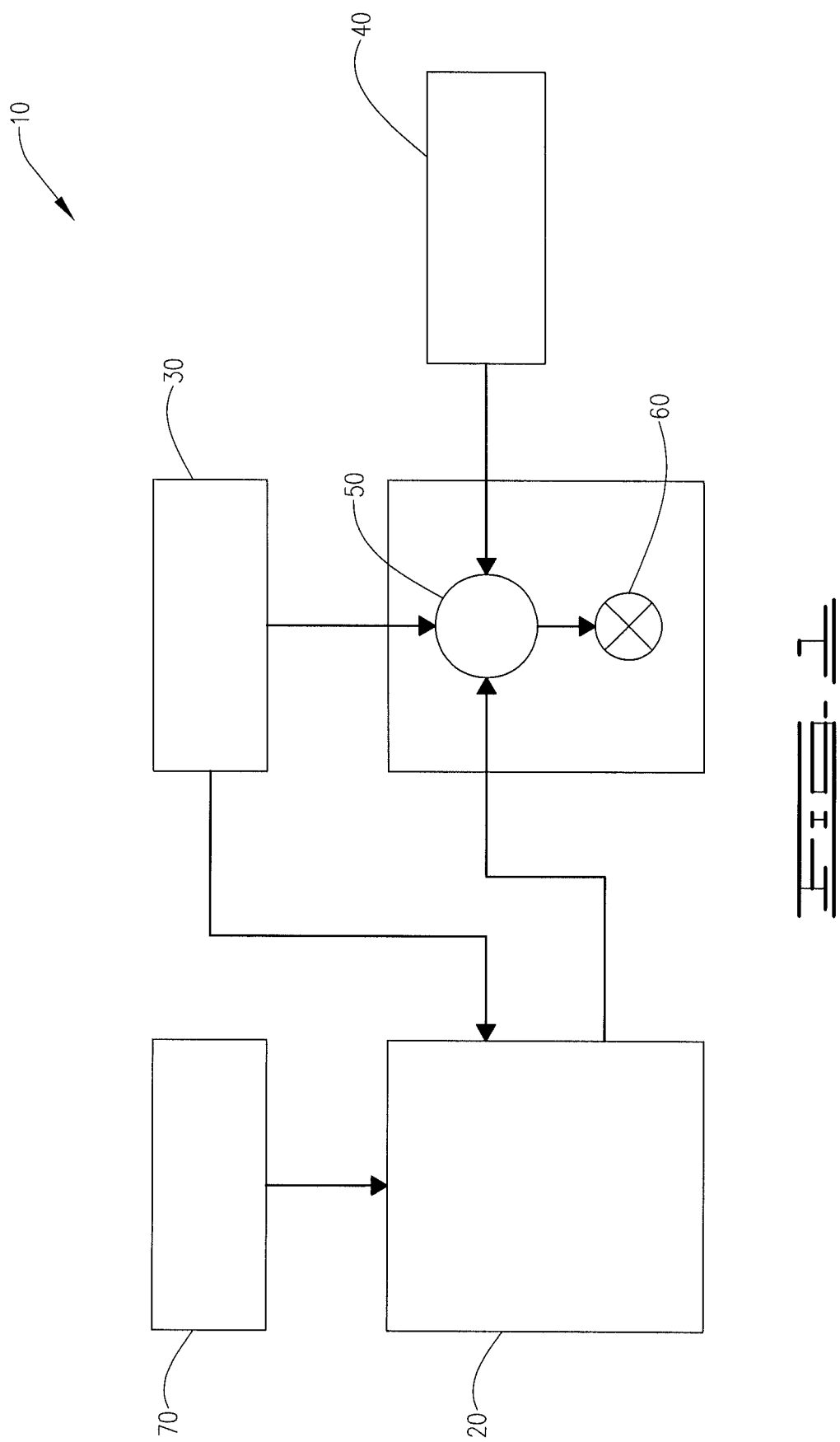
FIG. 1 is a diagram illustrating an example of a treatment fluid system that may be used in accordance with certain embodiments of the present disclosure.

The present disclosure may be understood more readily by reference to the following detailed description as well as to the examples included therein. For simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Of the many advantages of the present disclosure, the activators disclosed are very efficient at formation conditioning and gel breaking at low temperatures (below 60° C.).

The disclosed embodiments of treatment fluid include at least an aqueous base fluid, an oxidizing agent and an activator. The treatment fluid is introduced into a treatment zone of a well for use in a down-hole operation. The down-hole operation includes use of the treatment fluid in formation conditioning and gel breaking.

Suitable aqueous base fluids include fresh water, salt water, brine, formation brine, seawater, or any other aqueous fluid that, preferably, does not adversely interact with the other components used in accordance with this invention or with the subterranean formation.

Suitable oxidizing agents may be any type of a hydrogen peroxide source capable of giving free hydrogen peroxide at a low temperature in aqueous solutions. Suitable oxidizing agents include organic and inorganic oxidizers, and combinations thereof. Examples of suitable oxidizing agents include peroxides, persalts, persulphates, percarbonates, perphosphates, hypochlorite salts and combinations thereof.

Suitable peroxides include inorganic peroxides, organic peroxides, and combinations thereof. Examples of suitable inorganic peroxides may include hydrogen peroxide, alkali metal peroxides and alkaline earth metal peroxides. Examples of suitable alkali metal peroxides may include lithium peroxide, sodium peroxide, potassium peroxide, rubidium peroxide, cesium peroxide, francium peroxide, and combinations thereof. Examples of suitable alkaline earth metal peroxides may include magnesium peroxide, calcium peroxide, beryllium peroxide, strontium peroxide, barium peroxide, radium peroxide, and combinations thereof. Examples of suitable organic peroxides include urea-hydrogen peroxide, hydrogen peroxide, dibenzoyl peroxide, tertiarybutyl peroxide, urea peroxide, and combinations thereof.

Suitable persalts include inorganic persalts, persulfates, perborates, percarbonates, perphosphates, and combinations thereof.

Suitable persulfates include ammonium persulfate, alkali metal persulfates, alkaline earth metal persulfates, and combinations thereof. Examples of suitable alkali metal persulfates include lithium persulfate, sodium persulfate, potassium persulfate, rubidium persulfate, cesium persulfate, francium persulfate, and combinations thereof. Examples of suitable alkaline earth metal persulfates include magnesium persulfate, calcium persulfate, beryllium persulfate, strontium persulfate, barium persulfate, radium persulfate, and combinations thereof.

Suitable perborates include ammonium perborate, alkali metal perborates, alkaline earth metal perborates, and combinations thereof. Examples of suitable alkali metal perborates include lithium perborate, sodium perborate, sodium perborate monohydrate, sodium perborate tetrahydrate, potassium perborate, rubidium perborate, cesium perborate, francium perborate, and combinations thereof. Examples of suitable alkaline earth metal perborates include magnesium perborate, calcium perborate, beryllium perborate, strontium perborate, barium perborate, radium perborate, and combinations thereof.

Suitable percarbonates include alkali metal percarbonates, alkaline earth metal percarbonates, and combinations thereof. Examples of suitable alkali metal percarbonates include lithium percarbonate, sodium percarbonate, potassium percarbonate, rubidium percarbonate, cesium percarbonate, francium percarbonate, and combinations thereof. Examples of suitable alkaline earth metal percarbonates include magnesium percarbonate, calcium percarbonate, beryllium percarbonate, strontium percarbonate, barium percarbonate, radium percarbonate, and combinations thereof.

Suitable perphosphates include alkali metal perphosphates, alkaline earth metal perphosphates, and combinations thereof. Examples of suitable alkali metal perphosphates include lithium perphosphate, sodium perphosphate, sodium pyrophosphate peroxyhydrate, potassium perphosphate, rubidium perphosphate, cesium perphosphate, francium perphosphate, and combinations thereof. Examples of suitable alkaline earth metal perphosphates include magnesium perphosphate, calcium perphosphate, beryllium perphosphate, strontium perphosphate, barium perphosphate, radium perphosphate, and combinations thereof.

Suitable hypochlorite salts include alkali metal hypochlorite salts, alkaline earth metal hypochlorite salts, and combinations thereof. Examples of suitable alkali metal hypochlorite salts include lithium hypochlorite, sodium hypochlorite, potassium hypochlorite, rubidium hypochlorite, cesium hypochlorite, francium hypochlorite, and combinations thereof. Examples of suitable alkaline earth metal hypochlorite salts include magnesium hypochlorite, calcium hypochlorite, beryllium hypochlorite, strontium hypochlorite, barium hypochlorite, radium hypochlorite, and combinations thereof.

In addition, suitable oxidizing agents may also include any peroxide or peroxide-generating compound. One suitable peroxide-generating compound is hydrogen peroxide. Another is sodium percarbonate (or sodium carbonate peroxyhydrate), a granular product used as an alternative to perborate bleaches in household detergents that, when dissolved into water, releases H2O2 and soda ash (sodium carbonate). The pH of the resulting solution is typically alkaline, which activates the H2O2. Additional suitable peroxide-generating compounds include, but are not limited to, pentanedione peroxide, calcium peroxide, dichromates, permanganates, peroxydisulfates, sodium perborate, sodium carbonate peroxide, hydrogen peroxide, tertiarybutylhydroperoxide, potassium diperphosphate, and ammonium and alkali metal salts of dipersulfuric acid, alkali and alkaline earth percarbonates and persulfates and perchlorates. Specific examples include, but are not limited to, ammonium and alkali and alkaline earth persulfates such as ammonium, sodium and potassium persulfate. Additional examples include, but are not limited to, cumene hydroperoxide, t-butyl cumyl peroxide, di-t-butyl peroxide, di-(2-t-butylperoxyisopropyl)benzene, 2,5-dimethyl-2,5-di(t-butylperoxy)hexane, di-isopropylbenzene monohydroperoxide, di-cumylperoxide, 2,2-di-(t-butyl peroxy) butane, t-amyl hydroperoxide, benzoyl peroxide, any derivative of any of the foregoing, and any combination of the foregoing. Any combination of these suitable peroxide-generating compounds is suitable as well. Other suitable peroxide-generating compounds will be apparent to one skilled in the art, with the benefit of this disclosure.

Suitable activators include those selected from the group consisting of N-acyl caprolactam based activators, substitutes benzoyl caprolactam based activators and combinations thereof.

Suitable N-acyl caprolactam based activators are of the formula:

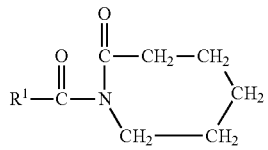

wherein R1 is H or an alkyl, aryl, alkaryl, or alkoxyaryl group containing from 1 to 12 carbons. Caprolactam activators wherein the $R^1$ comprises from 6 to about 12 carbon atoms provide hydrophobic species. Caprolactam activators wherein R1 comprises H or from about 1 to about 6 carbon atoms provide hydrophilic species.

N-acyl caprolactams include but are not limited to benzoyl caprolactam, formyl caprolactam, acetyl caprolactam, octanoyl caprolactam, propanoyl caprolactam, butanoyl caprolactam, nonanoyl caprolactam, pentanoyl caprolactam, decanoyl caprolactam, undecanoyl caprolactam, 3,5,5-trimethylhexanoyl caprolactam, propinoyl caprolactam, hexanoyl caprolactam, and combinations thereof.

Suitable substitutes benzoyl caprolactam based activators have the formula:

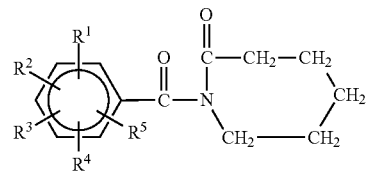

wherein $R^1$, $R^2$, $R^3$, $R^4$, and $R^5$ contain from 1 to 12 carbon atoms, preferably from 1 to 6 carbon atoms and are members selected from the group consisting of H, halogen, alkyl, alkoxy, alkoxyaryl, alkaryl, alkaryloxy, and substituents having the structure:

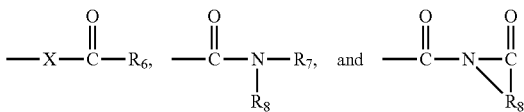

wherein $R_6$ is selected from the group consisting of H, alkyl, alkaryl, alkoxy, alkoxyaryl, alkaryloxy, and aminoalkyl; X is O, NH, or $NR_7$, wherein $R_7$ is H or a $C_1$-$C_4$ alkyl group; and $R_8$ is an alkyl, cycloalkyl, or aryl group containing from 3 to 11 carbon atoms; provided that at least one R substituent is not H.

In an embodiment, $R^1$, $R^2$, $R^3$, and $R^4$ are H and $R^5$ is selected from the group consisting of methyl, methoxy, ethyl, ethoxy, propyl, propoxy, isopropyl, isopropoxy, butyl, tert-butyl, butoxy, tert-butoxy, pentyl, pentoxy, hexyl, hexoxy, Cl, and $NO_3$. In another preferred embodiment, $R^1$, $R^2$, $R^3$ are H, and $R^4$ and $R^5$ are members selected from the group consisting of methyl, methoxy, and Cl.

Examples of substituted benzoyl caprolactams include methylbenzoyl caprolactam, ethylbenzoyl caprolactam, ethoxybenzoyl caprolactam, propylbenzoyl caprolactam, propoxybenzoyl caprolactam, isopropylbenzoyl caprolactam, isopropoxybenzoyl caprolactam, butylbenzoyl caprolactam, butoxybenzoyl caprolactam, tert-butylbenzoyl caprolactam, tert-butoxybenzoyl caprolactam, pentylbenzoyl caprolactam, pentoxybenzoyl caprolactam, hexylbenzoyl caprolactam, hexoxybenzoyl caprolactam, 2,4,6-trichlorobenzoyl caprolactam, pentafluorobenzoyl caprolactam, dichlorobenzoyl caprolactam, dimethoxybenzoyl caprolactam, 4-nitrobenzoyl caprolactam, 3-chlorobenzoyl caprolactam, 4-chlorobenzoyl caprolactam 2,4-dichlorobenzoyl caprolactam, terephthaloyl dicaprolactum, and mixtures thereof.

Optionally, the disclosed treatment fluids may be foamed with a foaming agent and a gas. In such embodiments, the treatment fluids also comprise a gas and a foaming agent. While various gases can be utilized for foaming the treatment fluids of this invention, nitrogen, carbon dioxide, and mixtures thereof are preferred. In examples of such embodiments, the gas may be present in a treatment fluid in an amount in the range of from about 5% to about 95% by volume of the treatment fluid, and more preferably in the range of from about 20% to about 80%. The amount of gas to incorporate into the fluid may be affected by factors including the viscosity of the fluid and wellhead pressures involved in a particular application. Examples of preferred foaming agents that can be utilized to foam and stabilize the fluids of this invention include, but are not limited to, alkylamidobetaines such as cocoamidopropyl betaine, alpha-olefin sulfonate, trimethyltallowammonium chloride, C8 to C22 alkylethoxylate sulfate, trimethylcocoammonium chloride, any derivative of any of the foregoing, and any combination of the foregoing. Cocoamidopropyl betaine is especially preferred. Other suitable surfactants available from Halliburton Energy Services, Inc., include, but are not limited to: "19N™," "G-Sperse Dispersant," "Morflo III®" surfactant, "Hyflo® IV M" surfactant, "Pen-88M™" surfactant, "HC-2™ Agent," "Pen-88 HT™" surfactant, "SEM-7™" emulsifier, "Howco-Suds™" foaming agent, "Howco Sticks™" surfactant, "A-Sperse™" dispersing aid for acid additives, "SSO-21E" surfactant, and "SSO-21MW™" surfactant. Other suitable foaming agents and foam stabilizing agents may be included as well, which will be known to those skilled in the art with the benefit of this disclosure. The foaming agent is generally present in fluid of the present invention in an amount in the range of from about 0.1% to about 5% w/v, more preferably in the amount of from about 0.2% to about 1% w/v, and most preferably about 0.5%.

Formation Conditioning

Generally, wells contain unconsolidated particulates (e.g., sand, gravel, proppant, fines, etc.) that may migrate out of the subterranean formation with the oil, gas, water, and/or other fluids produced by the wells. The presence of such particulates in produced fluids is undesirable in that the particulates may abrade pumping and other producing equipment and/or reduce the production of desired fluids from the well. Moreover, particulates that have migrated into a well bore (e.g., inside the casing and/or perforations in a cased hole), among other things, may clog portions of the well bore, hindering the production of desired fluids from the well. The term "unconsolidated particulates," and derivatives thereof, is defined herein to include loose particulates and particulates bonded with insufficient bond strength to withstand the forces created by the production of fluids through the formation. Unconsolidated particulates may comprise, among other things, sand, gravel, fines and/or proppant particulates in the subterranean formation, for example, proppant particulates placed in the subterranean formation in the course of a fracturing or gravel-packing operation.

One method used to control particulates involves consolidating unconsolidated particulates into stable, permeable masses by applying a consolidating agent (e.g., a resin or tackifying agent) to a portion of the subterranean formation. The application of such resins or tackifying agents is often referred to as a consolidation treatment. One problem that may be experienced in such consolidation treatments is the failure of the resin or tackifying agent to adhere to the rock surfaces of the formation. This failure may be due to the presence of oil, condensates, or other debris (collectively referred to herein as "contaminants") on the rock surfaces.

To combat this contaminants problem, oftentimes the formation may be pretreated prior to the consolidation treatment in an attempt to remove the oil and/or the debris and prepare the surface of the formation rock to allow the resin or tackifier (i.e. consolidation agent) to adhere to its surface (i.e. "formation conditioning"). Glycol ethers are an example of a type of solvent that may be used in such pre-treatments. The use of such solvents is very expensive because high concentrations of the solvent are necessary to achieve any sort of contaminant reduction. For example, it is often recommended that solutions comprising about 50% to about 100% of the solvent be used in relatively large pre-treatments. Additionally, many of these solvents present toxicity and handling concerns.

When the down-hole operation includes the use of the disclosed treatment fluid for formation conditioning, the treatment fluids are very efficient at removing contaminants from the rock surfaces. When compared to standard solvent pre-treatment techniques, the efficiency improvement is marked, especially with respect to the removal or reduction in the presence of oil as well as other contaminants such as unbroken bits of fracturing gel or organic deposits that are not soluble in standard solvents. Additionally, as an added benefit, the disclosed treatment fluids allow for some stimulation effect in that they remove contaminants from pore throats to clear flow paths for hydrocarbon production. Another benefit is that the disclosed treatment fluids are less expensive than solvent pre-treatments, and do not present the same sort of toxicity or handling concerns.

According to various embodiments the disclosed treatment fluid includes a N-acyl caprolactam or substitute benzoyl caprolactam based activators that can be used in conjunction with an oxidizing agent in order to removing contaminants from the rock surfaces in down-hole operations.

The amount of oxidizing agent used may be from about 0.1% to about 99.9% wt./vol. of aqueous base fluid. The oxidizing agent may also be in the amount of about 0.1% (8.33 lb/Mgal) to about 10% wt./vol. (833 lb/Mgal) of aqueous base fluid, or in the range of from about 1% (83.3 lb/Mgal) to about 5% wt./vol. (416 lb/Mgal) of aqueous base fluid. More generally, the oxidizing agents may be present in the treatment fluid in sufficient quantity to effectively remove contaminates in the subterranean formation.

The activator can be present in an amount of from about 0.001% to about 99.5 wt./vol. of aqueous base fluid. More preferably the activator can be present in the range of about 0.001% (0.0833 lb/Mgal) to about 20% (1666 lb/Mgal) or from about 0.01% (0.833 lb/Mgal) to about 10% (833 lb/Mgal).

A disclosed embodiment may include introducing the treatment fluid into a treatment zone of a well to remove contaminates from at least a portion of the treatment zone to form a cleaned portion. The treatment fluid removes the oil and/or the debris and prepares the surface of the formation rock in the subterranean formation to allow for a consolidation agent to adhere to its surface (i.e. "formation conditioning").

To provide for a controlled release, the oxidizing agent, the activator, or both may be in encapsulated form or coated form. The oxidizing agent and activator may be contemporaneously introduced into the well with the treatment fluid. Alternatively, the oxidizing agent and activator may be introduced into the well at differing times so that they come in contact with one another only in the treatment zone.

The activators and oxidizing agents can be encapsulated with various materials. Solid activators can be encapsulated by spray coating a variety of materials thereon. Such coating materials include, but are not limited to, waxes, drying oils such as Tung oil and linseed oil, polyurethanes and cross-linked partially hydrolyzed polyacrylics. The oxidizing agents are preferably encapsulated with a membrane comprising a partially hydrolyzed acrylic cross-linked with either an aziridine prepolymer or a carbodiimide, the membrane having imperfections through which an aqueous fluid can diffuse.

Subsequent to introducing the treatment fluid to remove contaminates, one can introduce a consolidation agent into the cleaned portion of the treatment zone. Suitable consolidation agents include resins, tackifiers, multifunctional materials, emulsions and combinations thereof.

Suitable resins for use as a consolidation agent include all resins known in the art that are capable of forming a hardened, consolidated mass. Many such resins are commonly used in subterranean consolidation operations, and some suitable resins include two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof.

Tackifiers for use as a consolidation agent may include any compound that, when in liquid form or in a solvent solution, will form a tacky, non-hardening coating upon a particulate. Suitable tackifiers include non-aqueous tackifying agents; aqueous tackifying agents; silyl-modified polyamides, and reaction products of an amine and a phosphate ester. The tackifiers are preferably coated on the particulates in an amount ranging from about 0.1% to about 5% by weight of the uncoated particulates, preferably ranging from about 0.5% to about 2.5% by weight of the uncoated particulates.

Suitable multifunctional materials for use as a consolidation agent include, but are not limited to, aldehydes, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde, aldehyde condensates, and silyl-modified polyamide compounds and the like, and combinations thereof. Suitable silyl-modified polyamide compounds that may be used in the present invention are those that are substantially self-hardening compositions capable of at least partially adhering to particulates in the unhardened state, and that are further capable of self-hardening themselves to a substantially non-tacky state to which individual particulates such as formation fines will not adhere to, for example, in formation or proppant pack pore throats. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water.

In embodiments where the consolidating agent is used in an emulsion form, the consolidating agent emulsions of the present invention comprise an aqueous fluid, a surfactant, and a consolidating agent. These consolidating agent emulsions have water external phases and oil internal phases. Suitable consolidating agents for the emulsion embodiments comprise all of the consolidation agents listed above. The consolidation agent may be present in an amount in the range from about 0.1% to about 10% by weight of the composition. The surfactant is preferably present in the consolidation agent emulsion in an amount in the range from about 0.1% to 10% by weight of the composition. The balance of the fluid is the aqueous base fluid (e.g., 40% to 97% by weight of the consolidation agent emulsion composition).

Gel Breaking

Viscosity-increasing fluids, also called gelling fluids are used in wells for a variety of down-hole operations where higher viscosity is needed than is typically achieved by aqueous fluids without a viscosity-increasing fluid. For example, in fracturing operations gelling fluids are often used to increase the viscosity of the treatment fluid to better keep the fractures open and carry the proppant into the fractures. Also, in gravel pack operations gelling fluids are used to place the gravel in the annulus between the wash pipe and casing or between the wash pipe and wellbore in uncased wells. Additionally, gelling fluids are used in creating a filter cake. Typically, filter cakes are formed by placing a gelling fluid down hole such that it forms a barrier on the surface in the in subsurface reservoir, such as on the wellbore wall. Often filter cakes are used to stop or reduce production of fluids from a reservoir.

After the proppant is introduced into the fractures, after the gravel is in place, or when the filter cake is no longer needed, the treatment fluid is introduced and the gel component is broken so that the viscosity of the fluid is reduced, thereby allowing the fluid to flow back to the surface and be recovered. This process may be referred to in the art as "breaking the fluid." The compositions or components employed to degrade the polymer can be referred to as "breakers."

Various embodiments of the disclosed treatment fluid provide for gel breaking systems and methods that are capable of breaking polymers and/or gels in oil and gas operations at low temperatures, and that produce environmentally acceptable side products. The gel breaking systems and methods are useful in operations where it is required to break gels and specifically are useful in down-hole operations that require gel breaking. Such operations include, but are not limited to, fracking operations, gravel packing operations and filter cake removal.

According to various embodiments the treatment fluid includes a N-acyl caprolactam or substitute benzoyl caprolactam based activators that can be used in conjunction with an oxidizing agent in order to break gels, particularly those used in oil and gas operations.

The activator and the oxidizing agent can efficiently break gels at low temperatures, for example, including less than about 180° C., less than about 100° C., less than 80° C., less than 60° C., less than 40° C., and less than 30° C. Additionally, the activators disclosed herein have various other advantages over prior activators. For example, the N-acyl caprolactam or substitute benzoyl caprolactam based activators, work as corrosion inhibitors and sulfide scavenger. Additionally, the activators react during use to produce side products useful as pH lowering agents, scrubbers, chelating agents and corrosion inhibitors. Further, the activators disclosed herein can meet sensitive environmental regulations regarding chemical use down hole The amount of oxidizing agent used may be from about 0.1% to about 99.9% wt./vol. of aqueous base fluid. The oxidizing agent may also be in the amount of about 0.1% (8.33 lb/Mgal) to about 10% wt./vol (833 lb/Mgal) of aqueous base fluid, or in the range of from about 1% (83.3 lb/Mgal) to about 5% wt./vol (416 lb/Mgal) of aqueous base fluid. More generally, the oxidizing agents may be present in the treatment fluid in sufficient quantity to effectively remove contaminates in the subterranean formation.

The activator can be present in an amount of from 0.001% to 99.5 wt./vol of aqueous base fluid. More preferably the activator can be present in the range of about 0.001% (0.0833 lb/Mgal) to about 20% (1666 lb/Mgal) or from about 0.01% (0.833 lb/Mgal) to about 10% (833 lb/Mgal).

The activator and the oxidizing agent also react to produce an active oxidizer, which acts to degrade the gel component. The active oxidizer produced acts to break the gel at low temperatures and result in the production of an organic oxy acid. The resulting organic oxy acid acts to bind or chelate to interfering metal ions from flow-back waters and produced water or metals that have been added as crosslinking agents. Such interfering metal ions can interfere with the gel breaking process as well as other down-hole operations. Interfering metal ions included, but are not limited to calcium, magnesium, manganese, strontium, boron, cobalt, copper, zirconium, titanium, aluminum, iron, chromium, hafnium, and the like.

For example, Benzoyl caprolactam (activator) interacting with an inorganic oxidizer releases perbenzoicacid (active oxidizer). The active oxidizer, perbenzoicacid, breaks the gel component and releases benzoic acid which acts to bind or chelate with metal ions. This interaction may also react to produce a caprolactam amide. The caprolactam amide undergoes hydrolysis to produce a caproic acid (amino acid) which also acts to bind or chelate with metal ions and functions as a scrubber for acid gas removal.

The treatment fluid described above can be used in a variety of methods, which can be useful for breaking a natural polymer or synthetic polymer (often referred to as a gel) particularly in a down-hole oil or gas operation. For example, various embodiments relate to a method that involves introducing the treatment fluid into a wellbore penetrating a subterranean formation to interacts with the gelling fluid to break the gel.

To provide for a controlled release, the oxidizing agent, the activator, or both may be in encapsulated form or coated form. The oxidizing agent and activator may be contemporaneously introduced into the well with the treatment fluid. Alternatively, the oxidizing agent and activator may be introduced into the well at differing times so that they come in contact with one another only in the treatment zone.

The activators and oxidizing agents can be encapsulated with various materials. Solid activators can be encapsulated by spray coating a variety of materials thereon. Such coating materials include, but are not limited to, waxes, drying oils such as Tung oil and linseed oil, polyurethanes and cross-linked partially hydrolyzed polyacrylics. The oxidizing agents are preferably encapsulated with a membrane comprising a partially hydrolyzed acrylic cross-linked with either an aziridine prepolymer or a carbodiimide, the membrane having imperfections through which an aqueous fluid can diffuse.

In some instances, a gelling fluid containing a gel component is introduced down-hole and gelled once it is at a predetermined location (treatment zone). In these instances, the treatment fluid can be added after the gelling fluid is gelled down-hole. The methods according to various embodiments allow the synthetic polymer to be substantially broken within a time period of from about 1 to about 72 hours. For example, the methods according to various examples allow the synthetic polymer to be substantially broken within a time period of about 24 hours.

Suitable gelling fluids include a gel component in an aqueous base fluid. The gelling fluid may also include proppant and/or gravel. Suitable aqueous base fluids include fresh water, salt water, brine, formation brine, seawater, or any other aqueous fluid that, preferably, does not adversely interact with the other components used in accordance with this invention or with the subterranean formation. In some embodiments, the aqueous base fluid may be present in the gelling fluids in an amount in the range from about 5% to about 99.99% by volume of the gelling fluid.

Suitable gel components for aqueous based fluids include water-soluble polymers. Such gel components include natural and synthetic polymers bearing borate crosslinkable functional groups. Synthetic polymers, such as polyacrylamides and polyacrylates, can be used as the gelling agent. Natural polymers include high-molecular weight polysaccharides, such as cellulose, polysaccharides composed of mannose and galactose sugars (galactomannans), and polysaccharides composed of mannose and glucose. For example, gel components can include cellulose, galactomannans, diutan and xanthan and can include derivatives thereof. Of the various galactomannan gelling agents, which can be utilized, guar and guar derivatives are preferred. Guar derivatives, for example, include hydropropyl guar (HPG), carboxymethyl guar (CMG), carboxymethylhydropropyl guar (CMHPG) and hydroxyethylated guar (HEG). Cellulose derivatives, for example, include hydroxyethylcellulose (HEC), hydroxypropylcellulose (HPC), carboxymethyl cellulose (CMC) and carboxymethylhydroxyethylcellulose (CMHEC). Preferred are galactomannan gelling agents selected from the group consisting of guar, hydroxyethylguar, hydroxypropylguar, carboxymethylguar, carboxymethylhydroxyethylguar, and mixtures thereof.

Typically, the concentration of gel components in the aqueous base fluid will depend on the desired viscosity. Often such concentrations are from about 5 lb/1000 gal of aqueous fluid to about 100 lb/1000 gal of aqueous fluid.

Gel components are sometimes activated by the addition of a crosslinker to the gelling fluid. Crosslinkers cause portions of the polymer or polymers comprising the gel components to interact with one another. Generally, the more the polymers or chemicals comprising the gel components interact with one another, the greater the viscosity of the gelling fluid.

Crosslinkers can be either instant or delayed crosslinkers. Instant crosslinkers tend to cause the polymers comprising the gel components to interact with one another quickly. Stated another way, instant crosslinkers cause a quick increase in viscosity or gelling of the gelling fluid. Typically, a substantial increase in viscosity or gelling of the gelling fluid will occur in under a minute and more typically in less than 30 seconds. Delayed crosslinkers tend to cause the polymers comprising the gel components to interact with one another more slowly. Depending on the delayed crosslinker, it can take on the order of a minute, several minutes or even an hour or more for a substantial increase in viscosity. With instant and delayed crosslinkers, the viscosity of the treatment fluid can be carefully controlled. Examples of instant crosslinkers include borate salts, boric acid, or boron trioxide as well as cations of zirconium, titanium aluminum, iron, magnesium as well as compounds containing boron.

Examples of delayed crosslinkers include polyhydroxyl containing compounds including glycerol, erythritol, threitol, ribitol, arabinitol, xylitol, allitol, altritol, sorbitol, mannitol, dulcitol, iditol and perseitol, zirconium-based crosslinkers, based on triethanolamine or hydroxyalkylated ethylenediamine. Although examples of instant and delayed crosslinkers have been provided, whether a particular compound acts as a delayed crosslinker or an instant crosslinker can depend on a variety of circumstances, especially the temperature of the fluid in the wellbore carrying the crosslinker.

In certain embodiments, the gelling fluids also may optionally comprise salts, pH control additives, surfactants, breakers, bactericides, fluid loss control additives, stabilizers, chelants, scale inhibitors, paraffin inhibitors, asphaltene inhibitors, mutual solvents, solvents, corrosion inhibitors, hydrate inhibitors, clay stabilizers, relative permeability modifiers (such as HPT-1™ chemical additive available from Halliburton Energy Services, Inc., Duncan, Okla.), sulfide scavengers, fibers, nanoparticles, consolidating agents (such as resins and/or tackifiers), combinations thereof, or the like.

As previously, indicated the disclosed treatment fluid can be used in various down-hole operations, including formation conditioning and gel breaking. In use, the exemplary methods and compositions disclosed herein may directly or indirectly affect one or more components or pieces of equipment associated with the preparation, delivery, recapture, recycling, reuse, and/or disposal of the disclosed compositions.

For example, and with reference to FIG. 1, the disclosed methods and compositions may directly or indirectly affect one or more components or pieces of equipment associated with an exemplary system 10, according to one or more embodiments. In certain instances, system 10 includes a treatment fluid producing apparatus 20, an aqueous base fluid source 30, a gravel source 40, and a pump and blender system 50 residing at the surface at a well site where a well 60 is located. In certain instances, treatment fluid producing apparatus 20 produces a treatment fluid by combining an aqueous base fluid from source 30, an oxidizing agent and an activator. Pump and blender system 50 pumps the treatment fluid down well 60.

Figure 2:
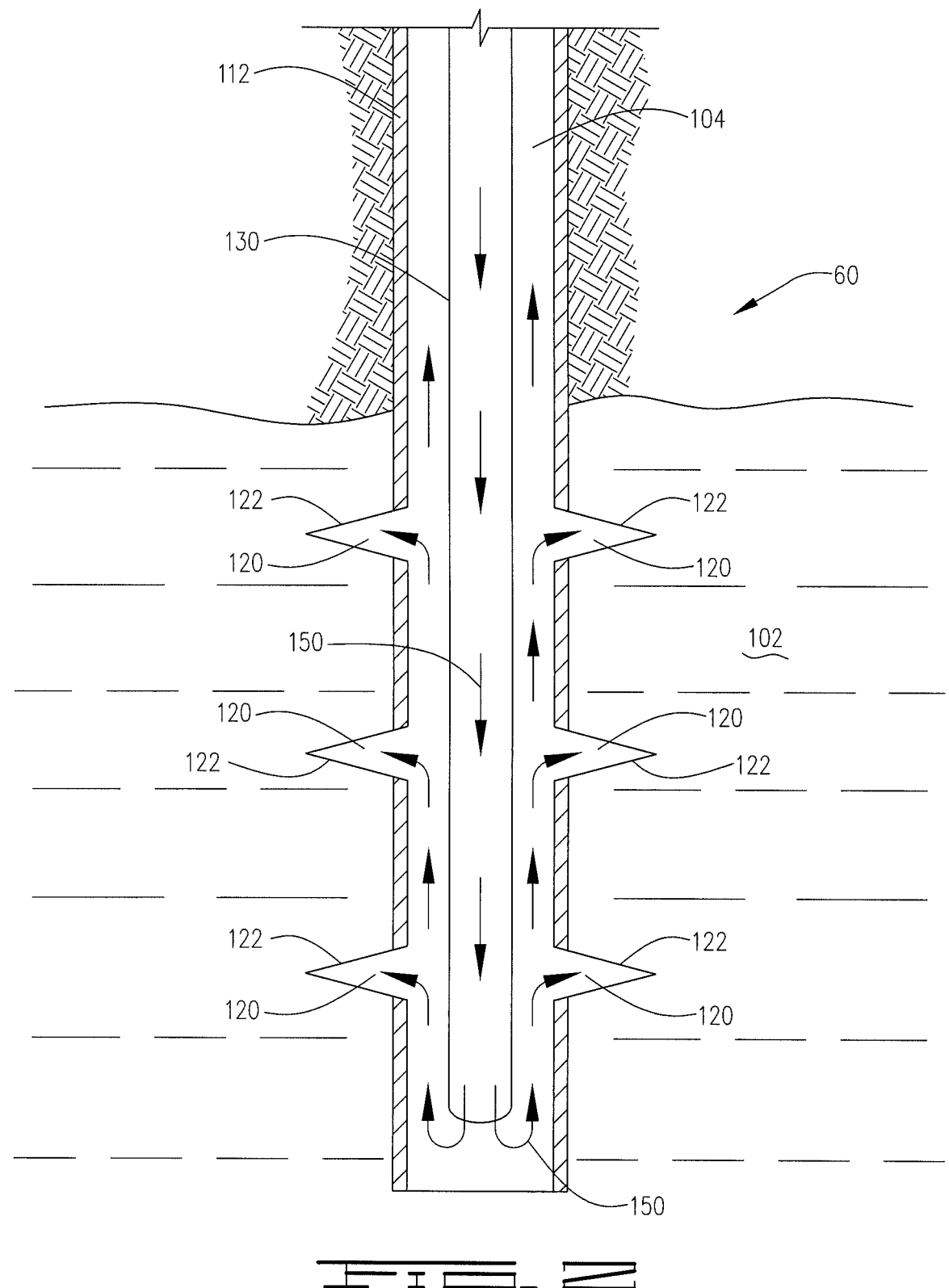
FIG. 2 is a schematic illustration of an example of a subterranean formation prepared for formation conditioning operations in accordance with certain embodiments of the present disclosure.

FIG. 2 depicts a treatment fluid 150 introduced through a pipe 130 into a treatment zone 120 of a wellbore 104 of well 60 for formation conditioning purposes. Although shown as vertical, wellbore 104 may include horizontal, vertical, slant, curved, and other types of wellbore geometries and orientations. Wellbore 104 can include a casing 112 that is cemented or otherwise secured to the wellbore wall. Wellbore 104 can be uncased or include uncased sections. Perforations can be formed in the casing 112 to allow reservoir fluids to flow into wellbore 104. In cased wells, perforations can be formed using shape charges, a perforating gun, hydro jetting and/or other tools. FIG. 2 shows a cased well 60 having perforations formed in casing 112. Pipe 130 is part of a work string, which may include coiled tubing, jointed pipe, and/or other structures that allow fluid flow. The working string can include flow control devices, bypass valves, ports, and or other tools or well devices that control a flow of fluid through the interior of the working string.

The treatment fluid is introduced into the wellbore 104. The treatment fluid enters the treatment zone 120 to remove oil, debris and/or other contaminates from at least a portion of treatment zone 120 to form a cleaned portion. The treatment fluid prepares a formation surface 122 to allow for a consolidation agent or gelling fluid to adhere thereto (i.e. "formation conditioning"). Subsequent to introducing the treatment fluid to remove contaminates, a consolidation agent or a gelling fluid can be introduced into the cleaned portion of treatment zone 120.

In another embodiment, the treatment fluid may be introduced subsequent to a gelling fluid to break the gel component of the fluid. For example, use of the treatment fluid to break gelling fluid may occur subsequent to gravel packing a well. Gravel packing is commonly used as a sand-control method to prevent production of formation sand or other fines from a poorly consolidated subterranean formation. In this context, "fines" are tiny particles, typically having a diameter of 43 microns or smaller, that have a tendency to flow through the formation with the production of hydrocarbon. The fines have a tendency to plug small pore spaces in the formation and block the flow of oil. As all the hydrocarbon is flowing from a relatively large region away from the wellbore toward a relatively small area immediately around the wellbore, the fines have a tendency to become densely packed and screen out or plug the area immediately around the wellbore. Moreover, the fines are highly abrasive and can be damaging to pumping and oilfield other equipment and operations.

Placing a relatively larger particulate near the wellbore helps filter out the sand or fine particles and prevents them from flowing into the well with the produced fluids. The primary objective is to stabilize the formation while causing minimal impairment to well productivity.

The particulate used for this purpose is referred to as "gravel." In the oil and gas field, and as used herein, the term "gravel" refers to relatively large particles in the sand size classification, that is, particles ranging in diameter from about 0.1 mm up to about 2 mm. Generally, a particulate having the properties, including chemical stability, of a low-strength proppant is used in gravel packing. An example of a commonly used gravel packing material is sand, having an appropriate particulate size range. For various purposes, the gravel particulates also may be coated with certain types of materials, including resins, tackifiers, and the like. For example, a tackifier can help with fines and resins can help to enhance conductivity (e.g., fluid flow) through the gravel pack.

In one common type of gravel packing, a mechanical screen is placed in the wellbore and the surrounding annulus is packed with a particulate of a larger specific size designed to prevent the passage of formation sand or other fines. Typically, the liquid carrier fluid is returned to the surface by flowing through the screen and up a wash pipe. The gravel is deposited around the screen to form a gravel pack, which is a highly permeable allowing hydrocarbon fluid to flow easily while blocking the flow of the particulate carried in the hydrocarbon fluids. As such, gravel packs can successfully prevent the problems associated with the production of particulate materials from the formation.

It is also common, for example, to gravel pack after a fracturing procedure, and such a combined procedure is sometimes referred to as a "frac-packing."

As with placing a proppant in a subterranean formation during hydraulic fracturing, in gravel packing a viscosified fluid can be used to help transport and place the gravel in the well. A continuous aqueous phase is formed with aqueous base fluid and a gel component, such as the cross-linked gelling agents described above, to form a viscosified fluid. The viscosified fluid typically has a viscosity from 10 cP to 75 cP. The gravel is suspended in the viscosified fluid such that it can be carried down hole to the appropriate location or the treatment zone. After the gravel is placed in the treatment zone, the viscosified fluid is typically broken in order to facilitate removal of the fluid.

Figure 3:
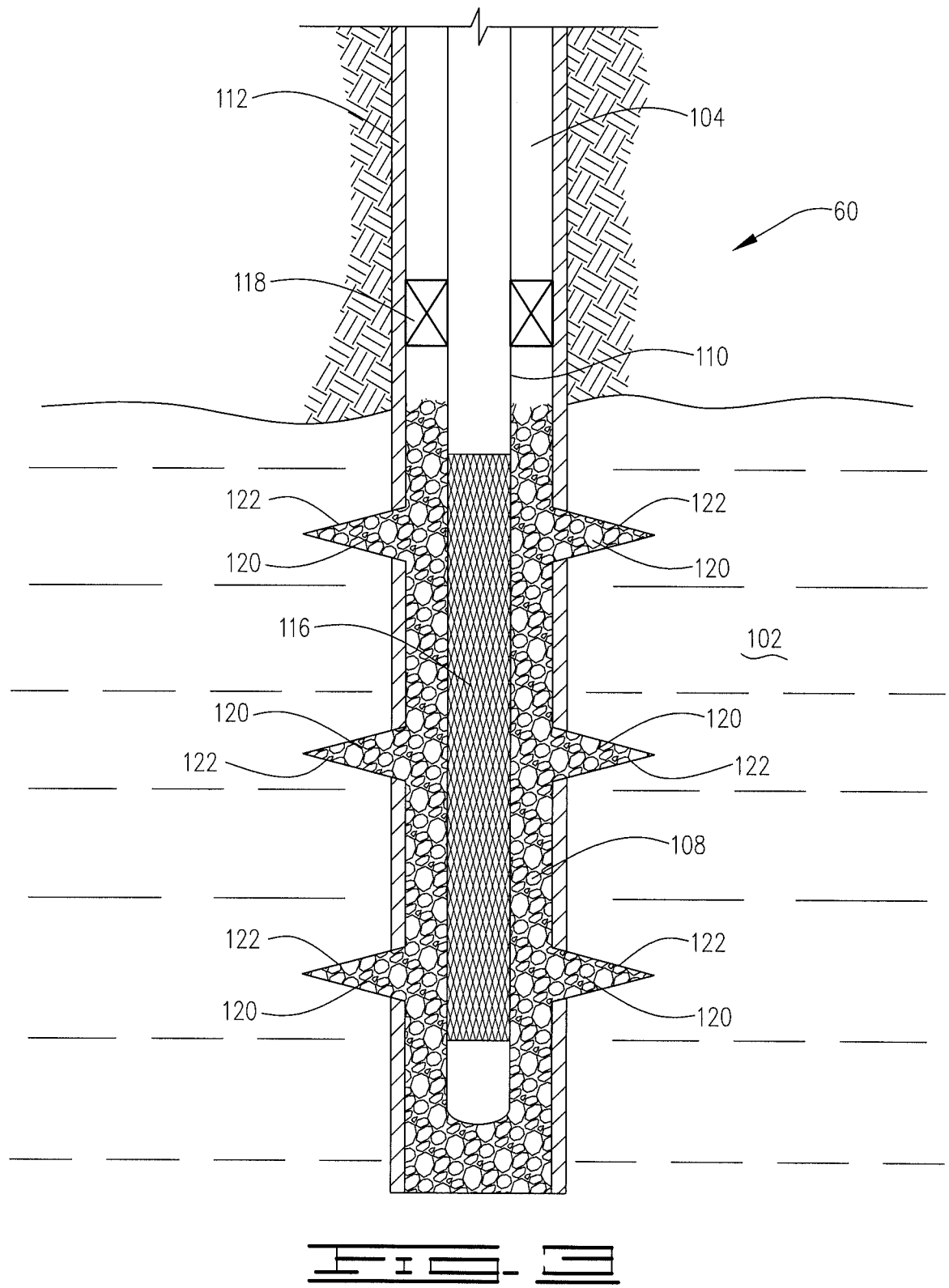
FIG. 3 is a schematic illustration of an example of a subterranean formation prepared for gel breaking operations in accordance with certain embodiments of the present disclosure.

FIG. 3 shows a gravel packed well 60. The gravel pack 130 is adjacent to portion of a formation surface 122. Gravel pack 130 forms in an annulus 108 between a wash pipe 110 and a casing 112 of wellbore 104. Reservoir fluids flow into wash pipe 110 through screen 116 but gravel pack 130 is retained in annulus 108 by screen 116 and a packer 118. Packer 118 is anchored and sealed in annulus 108 above the gravel pack 130. Wash pipe 110 is part of a work string, which may include coiled tubing, jointed pipe, and/or other structures that allow fluid flow. The working string can include flow control devices, bypass valves, ports, and or other tools or well devices that control a flow of fluid through the interior of the working string. The working string and/or the wellbore 104 may include one or more sets of packers 118 that seal annulus 108 between the working string and wellbore 104. Thus, the work string can have a packer 118 up-hole of the gravel pack 130 and can have a packer 118 down-hole of the gravel pack 130. FIG. 2 shows one packer 118 defining an up-hole boundary of the interval.

The gravel is often introduced down-hole in a gelling fluid through annulus 108 to create a gravel pack 130. The pump and blender system 50 can be coupled to the well to pump the gravel/gelling fluid into wellbore 104. After the gravel is in place, the treatment fluid is introduced into wash pipe 110. The treatment fluid enters treatment zones 120 to break the gel component of the gravel pack 130. Once broken, the gel component is removed through wash pipe 110 and the gravel remains.

In accordance with the above disclosure, several embodiments will now be described. In all embodiments, the treatment fluid includes an aqueous base fluid; an oxidizing agent selected from peroxides, persalts, persulfates, perborates, percarbonates, perphosphates, hypochlorite salts and combinations thereof, and an activator selected from N-acyl caprolactam based activators, substitutes benzoyl caprolactam based activators and combinations thereof.

In some embodiments, the treatment fluid can be introduced into a treatment zone of a well for use in downhole operations. In other embodiments, the oxidizing agent may be encapsulated prior to introducing the oxidizing agent into the treatment zone of the well for use in the down-hole operation. In still other embodiments, the activator may be encapsulated prior to introducing the activator into the treatment zone of the well for use in the down-hole operation.

The downhole operation may include introducing the treatment fluid into the treatment zone of a well to remove contaminates to form a cleaned portion. The clean portion provides a suitable formation surface for introducing consolidation agents or gelling fluids.

Another embodiment includes providing a gelling fluid having a continuous aqueous phase and gravel. The continuous aqueous phase includes an aqueous base fluid and a gel component. The gelling fluid enters the treatment zone of a well prior to or after introducing the treatment fluid. Once the gelling fluid is in place, the treatment fluid is introduced into the treatment zone. The treatment fluid breaks the gel component of the gelling fluid to facilitate removal of the gel component from the well bore.

Another embodiment includes providing a consolidation agent and introducing the consolidation agent to at least a portion of the cleaned portion of the treatment zone such that the consolidation agent adheres to at least a plurality of unconsolidated particulates in the cleaned portion of the treatment zone. The consolidation agent may be a resin, a tackifier, a multifunctional material or an emulsion.

The treatment fluid may be foamed having a foaming agent and a gas.

The oxidizing agent compound may be present in the treatment fluid in an amount in the range of from about 0.1% to about 10% wt./vol of aqueous base fluid. The activator is present in the treatment fluid in an amount of from about 0.001% to about 20% wt./vol. of aqueous base fluid.

The well can have a temperature at the treatment zone of less than about 180° C. or less than about 60° C. The continuous phase can have a viscosity from 10 cP to 75 cP.

Additionally, the treatment fluid can be introduced into the well using one or more pumps. The components of the treatment fluid can be mixed using a blender system.

Therefore, the present invention is well adapted to attain the ends and advantages mentioned, as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified, and all such variations are considered within the scope and spirit of the present invention. While compositions and methods are described in terms of "comprising," "containing," "having," or "including" various components or steps, the compositions and methods can also "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. The term "about" generally refers to a range of numbers that one of skill in the art would consider equivalent to the recited value (i.e., having the same function or result). In many instances, the term "about" may include numbers that are rounded to the nearest significant figure. Also, the terms in the claims have their plain, ordinary meaning unless otherwise explicitly and clearly defined by the patentee.

What is claimed is:
1. A method comprising:
    providing a treatment fluid comprising:
        an aqueous base fluid;
        an oxidizing agent selected from the group consisting of peroxides, persalts, persulfates, perborates, percarbonates, perphosphates, hypochlorite salts, and combinations thereof; and
        an activator selected from the group consisting of N-acyl caprolactam based activators substitutes benzoyl caprolactam based activators and combinations thereof;
    introducing the treatment fluid into a treatment zone of a subterranean formation to remove contaminants from at least a portion of the treatment zone to form a cleaned out portion of the subterranean formation;
    providing a gelling fluid comprising a continuous aqueous phase and gravel, wherein the continuous phase comprises: an aqueous base fluid and a gel component; and
    introducing the gelling fluid into the treatment zone, wherein the treatment fluid is introduced to break the gel component of the gelling fluid.
2. The method of claim 1, wherein introducing the gelling fluid into the treatment zone is prior to the step of introducing the treatment fluid.
3. The method of claim 1, wherein the oxidizing agent is encapsulated prior to introducing the oxidizing agent into the treatment zone of the well for use in the down-hole operation.
4. The method of claim 1, wherein the activator is encapsulated prior to introducing the activator into the treatment zone of the well for use in the down-hole operation.
5. The method of claim 1, further comprising a foamed treatment fluid comprising a foaming agent and a gas.
6. The method of claim 1, wherein the N-acyl caprolactam activators are selected from the group consisting of benzoyl caprolactam, formyl caprolactam, acetyl caprolactam, octanoyl caprolactam, propanoyl caprolactam, butanoyl caprolactam, nonanoyl caprolactam, pentanoyl caprolactam, decanoyl caprolactam, undecanoyl caprolactam, 3,5,5-trimethylhexanoyl caprolactam, propinoyl caprolactam, hexanoyl caprolactam, and combinations thereof.
7. The method of claim 1, wherein the substituted benzoyl caprolactam activators are selected from the group consisting of methylbenzoyl caprolactam, ethylbenzoyl caprolactam, ethoxybenzoyl caprolactam, propylbenzoyl caprolactam, propoxybenzoyl caprolactam, isopropylbenzoyl caprolactam, isopropoxybenzoyl caprolactam, butylbenzoyl caprolactam, butoxybenzoyl caprolactam, tert-butylbenzoyl caprolactam, tert-butoxybenzoyl caprolactam, pentylbenzoyl caprolactam, pentoxybenzoyl caprolactam, hexylbenzoyl caprolactam, hexoxybenzoyl caprolactam, 2,4,6-trichlorobenzoyl caprolactam, pentafluorobenzoyl caprolactam, dichlorobenzoyl caprolactam, dimethoxybenzoyl caprolactam, 4-nitrobenzoyl caprolactam, 3-chlorobenzoyl caprolactam, 4-chlorobenzoyl caprolactam 2,4-dichlorobenzoyl caprolactam, terephthaloyl dicaprolactum, and combinations thereof.
8. The method of claim 1, wherein the oxidizing agent compound is present in the treatment fluid in an amount in the range of from about 0.1% to about 10% wt/vol.
9. The method of claim 1, wherein the activator is present in the treatment fluid in an amount of from about 0.001% to about 20% wt/vol.

10. The method of claim 1 wherein the N-acyl caprolactam based activator is a N-acyl caprolactam derivative represented by the formula:

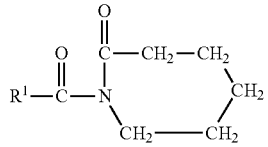

wherein $R^1$ is H, an alkyl, aryl, alkaryl, or alkoxyaryl group containing from 1 to 12 carbons; and wherein the substituted benzoyl caprolactam based activator is a substituted benzoyl caprolactam derivative having the formula:

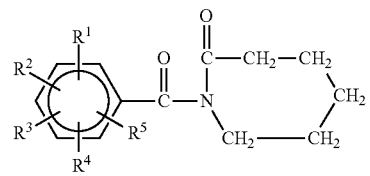

where $R^1$, $R^2$, $R^3$, $R^4$, and $R^5$ contain from 1 to 12 carbon atoms and are members selected from the group consisting of H, halogen, alkyl, alkoxy, alkoxyaryl, alkaryl, alkaryloxy, and substituents having the structure:

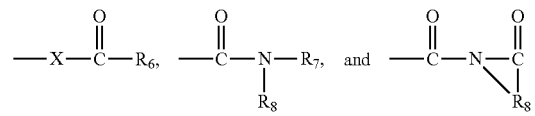

wherein $R_6$ is selected from the group consisting of H, alkyl, alkaryl, alkoxy, alkoxyaryl, alkaryloxy, and aminoalkyl; X is O, NH, or $NR_7$, wherein $R_7$ is H or a $C_1$-$C_4$ alkyl group; and $R_8$ is an alkyl, cycloalkyl, or aryl group containing from 3 to 11 carbon atoms; provided that at least one R substituent is not H.
11. The method of claim 1, wherein subsequent to the step of removing contaminates from at least a portion of the treatment zone to form a cleaned portion of the subterranean formation, the method further comprises:
    providing a consolidation agent; and
    introducing the consolidation agent to at least a portion of the cleaned portion of the treatment zone such that the consolidation agent adheres to at least a plurality of unconsolidated particulates in the cleaned portion of the treatment zone.
12. The method according to claim 1, wherein the treatment zone where the down-hole operation is located has a temperature less than about 80° C.
13. The method according to claim 1, wherein the treatment zone where the down-hole operation is located has a temperature less than about 60° C.
14. The method according to claim 1, wherein the treatment fluid is introduced into the well using one or more pumps.
15. The method according to claim 1, wherein the components of the treatment fluid are mixed using a blender system.

16. The method according to claim 1, wherein the continuous aqueous phase has a viscosity from 10 cP to 75 cP.

17. A method comprising:
- providing a treatment fluid comprising:
  - an aqueous base fluid;
  - an oxidizing agent selected from the group consisting of peroxides, persalts, persulfates, perborates, percarbonates, perphosphates, hypochlorite salts, and combinations thereof; and
  - an activator selected from the group consisting of N-acyl caprolactam based activators substitutes benzoyl caprolactam based activators and combinations thereof, and
  - wherein the oxidizing agent and activator are encapsulated prior to introducing the oxidizing agent and activator into a treatment zone of a subterranean formation;
- introducing the treatment fluid into the subterranean formation to remove contaminates from at least a portion of the treatment zone to form a cleaned portion of the subterranean formation;
- providing a gelling fluid comprising a continuous aqueous phase and gravel, wherein the continuous phase comprises: an aqueous base fluid and a gel component; and
- introducing the gelling fluid into the treatment zone, wherein the treatment fluid is introduced to break the gel component of the gelling fluid.

* * * * *